(12) United States Patent
Ono et al.

(10) Patent No.: US 12,346,925 B2
(45) Date of Patent: **\*Jul. 1, 2025**

(54) METHOD FOR PROVIDING INCENTIVE, SERVER, AND NON-TRANSITORY COMPUTER-READABLE RECORDING MEDIUM

(71) Applicant: GREE, INC., Tokyo (JP)

(72) Inventors: Yuichi Ono, Tokyo (JP); Takuya Watabe, Tokyo (JP); Yugo Takino, Tokyo (JP)

(73) Assignee: GREE, INC., Tokyo (JP)

(\*) Notice: Subject to any disclaimer, the term of this patent is extended or adjusted under 35 U.S.C. 154(b) by 6 days.

This patent is subject to a terminal disclaimer.

(21) Appl. No.: 18/382,866

(22) Filed: Oct. 23, 2023

(65) Prior Publication Data

US 2024/0046295 A1 Feb. 8, 2024

Related U.S. Application Data

(63) Continuation of application No. 17/710,155, filed on Mar. 31, 2022, now Pat. No. 11,842,364, which is a continuation of application No. 14/624,976, filed on Feb. 18, 2015, now Pat. No. 11,341,521.

(30) Foreign Application Priority Data

Feb. 18, 2014 (JP) .................................. 2014-028748

(51) Int. Cl.
*G06Q 30/0207* (2023.01)

(52) U.S. Cl.
CPC ................................. *G06Q 30/0207* (2013.01)

(58) Field of Classification Search
None
See application file for complete search history.

(56) References Cited

U.S. PATENT DOCUMENTS

| 2008/0070690 A1 | 3/2008 | Van Luchene et al. |
| 2008/0207296 A1 | 8/2008 | Lutnick et al. |
| 2009/0132352 A1* | 5/2009 | Kerven .................. G06Q 30/02 705/14.1 |

(Continued)

FOREIGN PATENT DOCUMENTS

| JP | 2013-066524 A | 4/2013 |
| JP | 2014-004164 A | 1/2014 |
| JP | 2014-006888 A | 1/2014 |

OTHER PUBLICATIONS

P. P. Felt, et al., AdDroid. Proceedings of the 7th ACM Symposium on Information, Computer and Communications Security—ASIACCS '12. doi: 10.1145/2414456.2414498, 2012.

(Continued)

*Primary Examiner* — Allan J Woodworth, II
(74) *Attorney, Agent, or Firm* — Oliff PLC

(57) ABSTRACT

A system and a method allow for the provision of an incentive between different applications. A server stores information including, in association, a user identifier, a first identifier, and a second identifier received from a client terminal, and when receiving an incentive request, causes an application server to provide an incentive to the user pertaining to the first identifier corresponding to the second identifier based on the information.

17 Claims, 7 Drawing Sheets

(56) References Cited

U.S. PATENT DOCUMENTS

| | | | |
|---|---|---|---|
| 2011/0047013 A1* | 2/2011 | McKenzie, III | G06Q 10/10 |
| | | | 705/14.4 |
| 2012/0110568 A1 | 5/2012 | Abel et al. | |
| 2012/0265604 A1* | 10/2012 | Corner | H04W 4/21 |
| | | | 705/14.39 |
| 2012/0302324 A1 | 11/2012 | Guinn et al. | |
| 2012/0315993 A1* | 12/2012 | Dumont | A63F 13/69 |
| | | | 463/42 |
| 2013/0232183 A1 | 9/2013 | Lee et al. | |
| 2013/0274001 A1 | 10/2013 | de Jesus | |
| 2014/0236742 A1 | 8/2014 | Sakuma | |
| 2014/0282497 A1* | 9/2014 | Farm | G06Q 30/02 |
| | | | 717/176 |
| 2014/0351041 A1* | 11/2014 | Brown | G06Q 30/0246 |
| | | | 705/14.45 |

OTHER PUBLICATIONS

May 15, 2018 Office Action issued in Japanese Patent Application No. 2017-122049.

Aug. 8, 2023 Office Action issued in Japanese Patent Application No. 2022-127624.

Oct. 24, 2023 Office Action issued in Japanese Patent Application No. 2022-127624.

* cited by examiner

FIG. 2

| Terminal ID | First application user ID | Second application user ID | ... |
|---|---|---|---|
| ST001 | A101 | B029 | ... |
| ST002 | A103 | B021 | ... |
| ST003 | A121 | B001 | ... |
| ST004 | A145 | B123 | ... |
| ST005 | A143 | B234 | ... |
| ... | ... | ... | ... |

| First application user ID | Ad click notification | Notification time |
|---|---|---|
| A101 | 1 | 2014-01-07 14:30 |
| A102 | 0 | — |
| A103 | 0 | — |
| A104 | 1 | 2014-01-08 18:35 |
| A105 | 0 | — |
| ... | ... | ... |

| First application user ID | Friend user | Friend user | Friend user | ⋮ |
|---|---|---|---|---|
| A101 | A103 | A121 | A157 | ⋮ |
| A103 | A101 | A158 | A200 | ⋮ |
| A121 | A101 | A201 | A203 | ⋮ |
| A145 | A271 | A301 | A303 | ⋮ |
| A143 | A401 | A403 | A405 | ⋮ |
| ⋮ | ⋮ | ⋮ | ⋮ | ⋮ |

213

METHOD FOR PROVIDING INCENTIVE, SERVER, AND NON-TRANSITORY COMPUTER-READABLE RECORDING MEDIUM

CROSS-REFERENCE TO RELATED APPLICATION

This application is a continuation of U.S. Ser. No. 17/710,155 filed Mar. 31, 2022, which is a continuation of U.S. Ser. No. 14/624,976 filed Feb. 18, 2015, which claims priority to and the benefit of Japanese Patent Application No. 2014-028748 filed Feb. 18, 2014, the entire contents of the prior applications being incorporated herein by reference.

TECHNICAL FIELD

The present disclosure relates to a method for providing an incentive, a server, and a non-transitory computer-readable recording medium.

BACKGROUND ART

In a conventional online game system, a plurality of users participate using client terminals. An application for online gaming is installed on each client terminal, and the user participates in the online game using the application. In such a system, a mechanism for providing an incentive is adopted on the same platform (i.e. in the same online game using the same application; for example, see Patent Literature 1).

CITATION LIST

Patent Literature

Patent Literature 1: JP 2013-066524 A

SUMMARY

Technical Problem

In a conventional system, however, it is assumed that an incentive is provided on the same platform, and an incentive cannot be provided between different platforms, i.e. between different applications.

The present disclosure has been conceived in light of the above problem and provides a method, a server, and a non-transitory computer-readable recording medium that can provide an incentive between different applications.

Solution to Problem

In order to solve the above problem, a method according to the present disclosure is a method for a system comprising a server, a client terminal, and an application server, the method comprising: the client terminal transmitting a user identifier and a first identifier to the server when a first application is launched; transmitting the user identifier and a second identifier to the server when a second application is launched; and transmitting an incentive request that includes the second identifier to the server when a predetermined operation pertaining to the second application is performed; and the server storing information including, in association, the user identifier, the first identifier, and the second identifier received from the client terminal; and when receiving the incentive request, causing the application server to provide an incentive to a user pertaining to the first identifier corresponding to the second identifier based on the information.

In the method according to the present disclosure, the user identifier may be an identifier uniquely identifying the client terminal, the first identifier may be an identifier uniquely identifying a user in the first application, and the second identifier may be an identifier uniquely identifying a user in the second application.

The method according to the present disclosure may further comprise: when receiving the incentive request, the server transmitting, to the application server, a request yielded by converting the second identifier included in the incentive request to the first identifier; and the application server providing the incentive to the user pertaining to the first identifier based on the request.

The method according to the present disclosure may further comprise: when an ad displayed in the first application is clicked, the client terminal transmitting, to the server, notification of an ad click, the notification including the first identifier, and installing the second application on the client terminal; and the server storing an indication of existence of the notification for each user, converting the second identifier included in the incentive request to the first identifier when receiving the incentive request, and transmitting the request to the application server when notification pertaining to the first identifier exists.

The method according to the present disclosure may further comprise: the server transmitting the request to the application server when receiving the incentive request within a predetermined time period from the notification.

The method according to the present disclosure may further comprise: the client terminal transmitting friend graph information pertaining to the first application to the server and the server storing the friend graph information; the client terminal transmitting an installation notification to the server when the second application is installed; and when receiving the installation notification, the server transmitting the ad to a client terminal of a friend user based on the friend graph information.

The method according to the present disclosure may further comprise: the client terminal transmitting, to the server, consent information indicating whether consent is provided for transmission of the ad; and the server transmitting the ad to the client terminal of the friend user based on the consent information.

The method according to the present disclosure may further comprise: the client terminal of the friend user transmitting, to the server, a second installation notification when the second application is installed on the client terminal of the friend user based on the ad; and when receiving the second installation notification, the server providing an incentive to a user that transmitted the installation notification.

A server according to the present disclosure comprises: communication means for receiving a user identifier and a first identifier when a first application is launched, receiving the user identifier and a second identifier when a second application is launched, and receiving an incentive request that includes the second identifier when a predetermined operation pertaining to the second application is performed; storage means for storing information including, in association, the user identifier, the first identifier, and the second identifier received from a client terminal; and control means for, when receiving the incentive request, causing an application server to provide an incentive to a user pertaining to the first identifier corresponding to the second identifier based on the information.

A non-transitory computer-readable recording medium according to the present disclosure stores instructions to be executed on a computer functioning as a server in a system comprising the server, a client terminal, and an application server, the instructions causing the computer to execute the steps of: receiving a user identifier and a first identifier when a first application is launched, receiving the user identifier and a second identifier when a second application is launched, and receiving an incentive request that includes the second identifier when a predetermined operation pertaining to the second application is performed; storing information including, in association, the user identifier, the first identifier, and the second identifier received from the client terminal; and when receiving the incentive request, causing the application server to provide an incentive to a user pertaining to the first identifier corresponding to the second identifier based on the information.

Advantageous Effect

The method, server, and non-transitory computer-readable recording medium according to the present disclosure allow for the provision of an incentive between different applications.

BRIEF DESCRIPTION OF DRAWINGS

The present disclosure will be further described below with reference to the accompanying drawings, wherein:

FIG. 2 is an example of an ID management table;

FIG. 3 is an example of a table of ad click notifications;

FIG. 6 is an example of a friend graph table; and

DESCRIPTION OF EMBODIMENTS

The following describes embodiments of the present disclosure.

Embodiment 1

Figure 1:
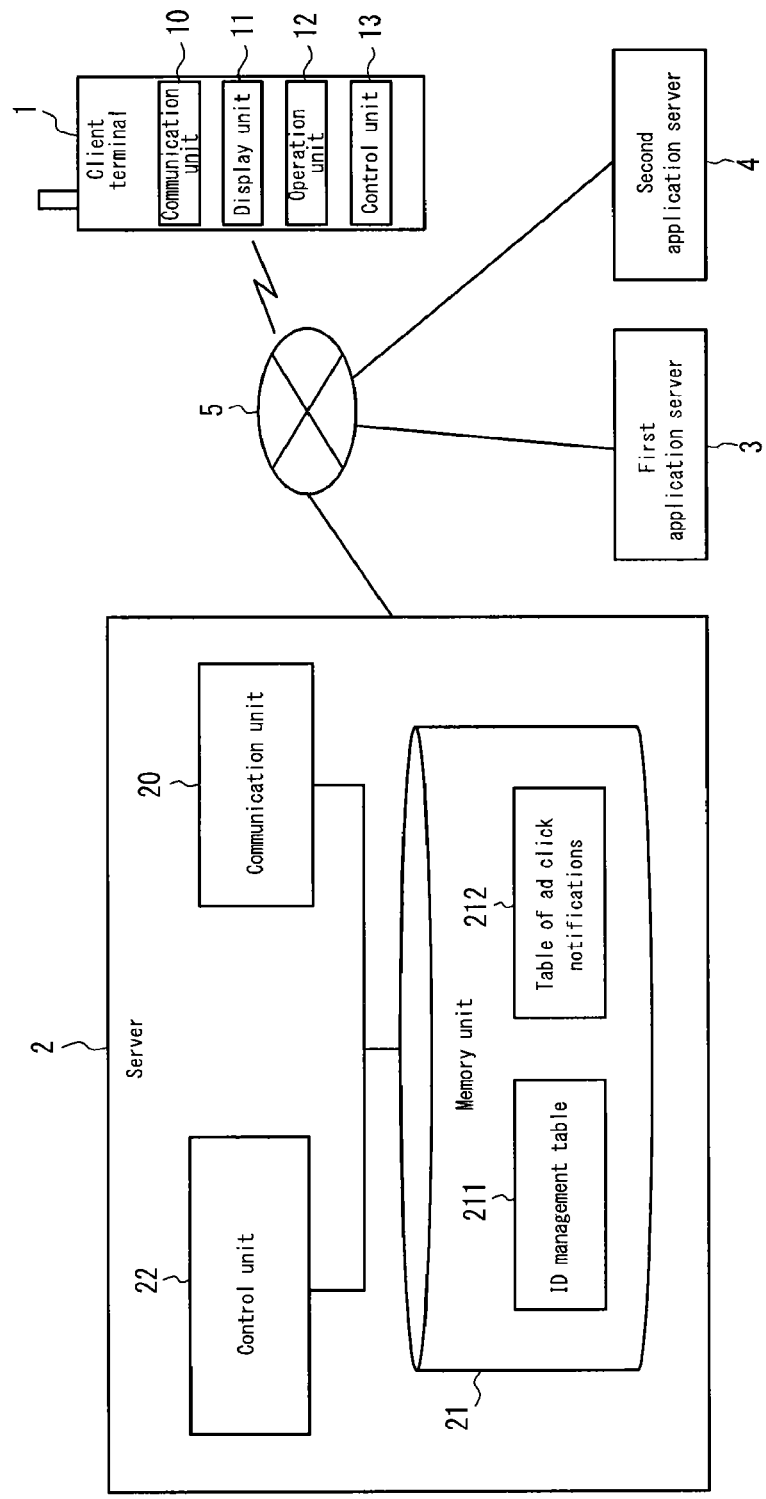
FIG. 1 is a block diagram of an incentive provision system according to Embodiment 1.

FIG. 1 is a block diagram of an incentive provision system according to Embodiment 1 of the present disclosure. The incentive provision system according to Embodiment 1 of the present disclosure includes a client terminal 1, a server 2 (distribution server 2), a first application server 3, and a second application server 4, all of which are connected over a network 5. The server 2 corresponds to the "server" of the present disclosure.

Overall, in the present system, a plurality of applications are installed on the client terminal 1. In the present embodiment, an example is described of two applications being installed, namely a first application and a second application. The first application is, for example, a card game. The second application is, for example, a puzzle game. Each application is a game that progresses by transmitting and receiving information pertaining to the game by communicating with a server. In other words, the first application and the second application proceed by communicating respectively with the first application server 3 and the second application server 4.

The client terminal 1 is, for example, a mobile phone, a smart phone, a tablet terminal, or the like, and includes a communication interface 10, a display 11, a user interface 12, and a control processor 13. It is assumed that the first application is installed in advance on the client terminal 1. In the first application, an advertisement (ad) for the second application (second application ad) is displayed. The second application ad is an ad that encourages installation of the second application. The content of the second application ad is, for example, "Click here to install the second application! If you finish the tutorial on the second application, you'll get card X to use in the first application!". Upon the user performing a selection operation such as clicking, tapping, or the like (referred to below as a click) on the second application ad while the first application is running, the second application is downloaded and installed on the client terminal 1.

The communication interface 10 communicates with the server 2 over either or both of a wireless and wired connection.

The display 11 may be configured using a liquid crystal display, organic EL display, or the like. The display 11 outputs display pertaining to the applications installed on the terminal. For example, if the first application is a card game, the display 11 outputs display pertaining to the game.

The user interface 12 is configured using buttons, a touch panel, or the like, and receives input signals from the user. The user interface 12 also transmits the input signals received from the user to the control processor 13.

The control processor 13 performs a variety of control pertaining to the client terminal 1. Specifically, based on operation of the user interface 12 by the user, the control processor 13 launches the first application installed on the terminal. Once the first application is launched, the control processor 13 transmits a terminal ID and a first application user ID to the server 2 via the communication interface 10. The terminal ID is an identifier for uniquely identifying the user of the client terminal 1. Specifically, the terminal ID may be an Android ID, an ID for advertisement tracking (IDFA or IFA: Identifier for Advertisers), a MAC address (Media Access Control Address), or the like. The first application user ID is an identifier for uniquely identifying the user in the first application. The terminal ID corresponds to the "user identifier" of the present disclosure, and the first application user ID corresponds to the "first identifier" of the present disclosure.

After the first application is launched, the control processor 13 displays the second application ad using the display 11. When the second application ad is clicked by user operation of the user interface 12, the control processor 13 transmits an ad click notification to the server 2 via the communication interface 10. The ad click notification is information indicating that the second application ad has been clicked by a predetermined user. The ad click notification includes the first application user ID pertaining to the user of the client terminal 1. After transmitting the ad click notification to the server 2, the control processor 13 installs the second application on the client terminal 1.

Based on operation of the user interface 12 by the user, the control processor 13 launches the second application installed on the client terminal 1. Once the second application is launched, the control processor 13 transmits the terminal ID and a second application user ID to the server 2.

The second application user ID is an identifier for uniquely identifying the user in the second application. The second application user ID corresponds to the "second identifier" of the present disclosure. The structure of the user identifier in the first application differs from the structure of the user identifier in the second application.

The control processor 13 also determines whether a predetermined operation pertaining to the second application has been performed. The predetermined operation is determined in advance and is an operation such as launching the second application, finishing a tutorial on the second application, or the like. When the predetermined operation is performed, the control processor 13 transmits an incentive request to the server 2. The incentive request is information requesting the provision of an incentive in the first application. The incentive request includes information pertaining to the second application user ID and the predetermined operation. Note that the predetermined operation is not limited to the examples above and may, for example, be participation for the first time in a guild battle in the second application. Alternatively, the predetermined operation may be giving a present to a friend for the first time in the second application, logging into the second application with a predetermined persistency rate, or the like.

The server 2 includes a communication interface 20, a memory 21, and a control processor 22.

The communication interface 20 communicates with the client terminal 1 over either or both of a wireless and wired connection.

The memory 21 stores a variety of information. Specifically, the memory 21 stores an ID management table 211 and a table 212 of ad click notifications. The ID management table 211 is a table that includes each terminal ID, first application user ID, and second application user ID received from the client terminal 1. FIG. 2 illustrates an example of the ID management table 211. The ID management table 211 illustrated in FIG. 2 for example includes "ST001", "A101", and "B029" respectively as the terminal ID, first application user ID, and second application user ID. The ID management table 211 corresponds to the "information including, in association, the user identifier, the first identifier, and the second identifier" of the present disclosure.

The table 212 of ad click notifications is a table including each ad click notification received from the client terminal 1. FIG. 3 illustrates an example of the table 212 of ad click notifications. The table 212 of ad click notifications illustrated in FIG. 3 includes, in association with a terminal ID, an indication of existence (i.e. receipt) of an ad click notification and the time of receipt of the ad click notification (notification time). In FIG. 3, the indication of receipt is set to 1 when an ad click notification has been received and to 0 when not received.

The control processor 22 controls the server 2 in a variety of ways. Specifically, upon receiving the terminal ID and the first application user ID from the client terminal 1 via the communication interface 20, the control processor 22 stores the terminal ID and the first application user ID in the memory 21. Furthermore, upon receiving the terminal ID and the second application user ID from the client terminal 1 via the communication interface 20, the control processor 22 stores the terminal ID and the second application user ID in the memory 21. The control processor 22 stores this information as the above-described ID management table 211, storing the terminal ID, first application user ID, and second application user ID in association.

When receiving an ad click notification from the client terminal 1 via the communication interface 20, the control processor 22 stores information pertaining to the ad click notification in the memory 21 as the table 212 of ad click notifications. Based on the first application user ID included in the ad click notification, the control processor 22 sets the indication of receipt of an ad click notification pertaining to that first application user ID to 1. The control processor 22 also stores the time that the ad click notification was received in the table 212 of ad click notifications.

When receiving an incentive request from the client terminal 1 via the communication interface 20, the control processor 22 converts the second application user ID included in the incentive request to the first application user ID based on the ID management table 211. Next, the control processor 22 determines whether an ad click notification pertaining to the first application user ID has been received based on the table 212 of ad click notifications. When an ad click notification has been received, the control processor 22 transmits, to the first application server 3, the incentive request in which the second application user ID has been converted to the first application user ID (converted incentive request). On the other hand, when no ad click notification has been received, the control processor 22 does not transmit the converted incentive request to the first application server 3.

The first application server 3 is a server for the first application and transmits and receives a variety of information by communicating with a client terminal 1 on which the first application is installed. The first application server 3 manages a variety of information for each first application user ID pertaining to the first application. For example, when the first application is a card game, the first application server 3 manages the cards, items, various types of point information, and the like possessed by the user based on the first application user ID. In a card game, there are rare cards or rare items that are difficult to obtain, and points are necessary to obtain cards or items. The first application may be a native application, a web application, or a hybrid application combining a native application with a web application. A program in accordance with the type of the first application is installed in advance on the first application server 3.

When receiving the converted incentive request from the server 2, the first application server 3 provides the user with a predetermined incentive based on the first application user ID included in the converted incentive request and on information pertaining to a predetermined operation. For example, the first application server 3 provides the user with a predetermined card or item, or with a predetermined number of points. The first application server 3 may vary the provided incentive in accordance with the content of the predetermined operation. In other words, in the present system, when receiving the incentive request, the server 2 causes the first application server 3 to provide an incentive to the user pertaining to the first application user ID corresponding to the second application user ID based on the ID management table 211.

The second application server 4 is a server for the second application and transmits and receives a variety of information by communicating with a client terminal 1 on which the second application is installed. The second application server 4 manages a variety of information for each second application user ID pertaining to the second application. For example, when the second application is a puzzle game, then based on the second application user ID, the second application server 4 manages the various types of point information and the like possessed by the user. The second application may be a native application, a web application, or a hybrid application combining a native application with a web application. A program in accordance with the type of the second application is installed in advance on the second application server 4.

Figure 4:
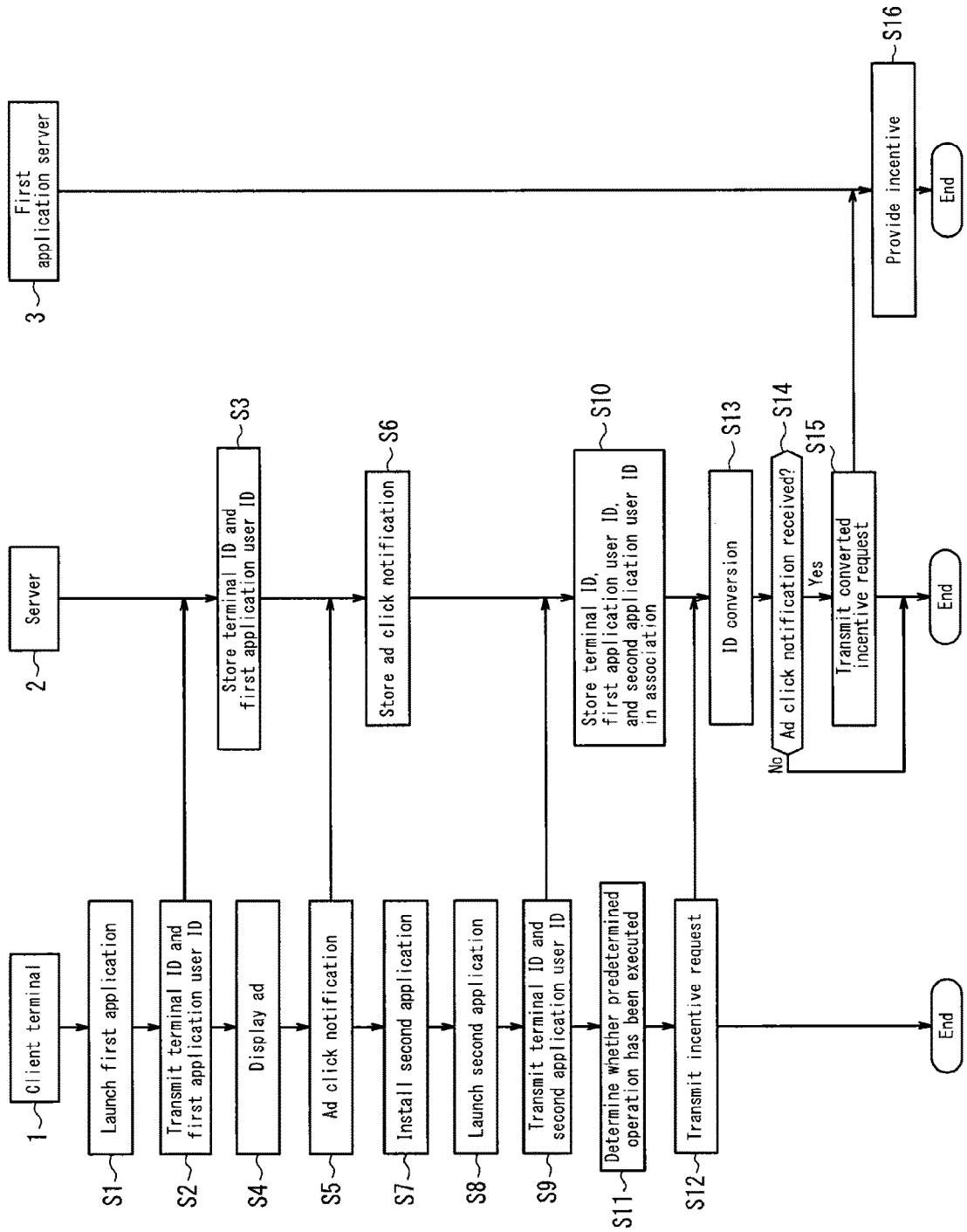
FIG. 4 is a flowchart illustrating operations of the incentive provision system according to Embodiment 1.

Next, operations for incentive provision in the incentive provision system according to the present disclosure are described with reference to the flowchart in FIG. 4. The following describes the case of the user whose terminal ID is ST001 operating the client terminal 1.

First, based on operation of the user interface 12 by the user, the control processor 13 of the client terminal 1 launches the first application installed on the terminal (step S1).

Next, the control processor 13 transmits the terminal ID (i.e. ST001) and the first application user ID (i.e. A101) to the server 2 via the communication interface 10 (step S2). The control processor 22 of the server 2 stores the terminal ID and the first application user ID in the memory 21 (step S3).

Next, after the first application is launched, the control processor 13 of the client terminal 1 displays the second application ad (step S4). When the second application ad is clicked or the like by user operation of the user interface 12, the control processor 13 transmits an ad click notification to the server 2 via the communication interface 10 (step S5). The control processor 22 of the server 2 stores information pertaining to the ad click notification in the memory 21 as the table 212 of ad click notifications (step S6).

After transmitting the ad click notification to the server 2, the control processor 13 of the client terminal 1 installs the second application on the client terminal 1 (step S7). Based on operation of the user interface 12 by the user, the control processor 13 then launches the second application installed on the client terminal 1 (step S8). Once the second application is launched, the control processor 13 transmits the terminal ID (i.e. ST001) and the second application user ID (i.e. B029) to the server 2 (step S9). The control processor 22 of the server 2 stores the terminal ID and the second application user ID in the memory 21 (step S10).

Next, the control processor 13 determines whether a predetermined operation pertaining to the second application has been executed (step S11), and when the predetermined operation has been executed, the control processor 13 transmits an incentive request to the server 2 (step S12).

When receiving the incentive request from the client terminal 1 via the communication interface 20, the control processor 22 of the server 2 converts the second application user ID included in the incentive request (i.e. B029) to the first application user ID (i.e. A101) based on the ID management table 211 (step S13). Next, the control processor 22 determines whether an ad click notification pertaining to the first application user ID has been received based on the table 212 of ad click notifications (step S14). When an ad click notification pertaining to the first application user ID has been received (step S14: yes), the control processor 22 transmits the converted incentive request to the first application server 3 (step S15). Specifically, for user A101, the control processor 22 determines whether an ad click notification has been received based on the table 212 of ad click notifications in FIG. 3. When receiving the converted incentive request from the server 2, the first application server 3 provides the user with a predetermined incentive based on the first application user ID included in the converted incentive request (i.e. A101) and on a predetermined operation (step S16).

In the incentive provision system according to Embodiment 1, the client terminal 1 transmits the terminal ID and the application ID to the server 2 upon launching of each application, and the server 2 stores the terminal ID, the first application user ID, and the second application user ID in association. Therefore, this system allows for incentive provision between different applications. Since the second application ad displayed in the first application leads to incentive provision in the first application, the second application ad is enticing for the user and has a strong advertising affect. The incentive provision system according to the present embodiment can thus increase the advertising effect of an ad for an application displayed in another application.

When the first application is launched, and the control processor 13 of the client terminal 1 transmits the terminal ID to the server 2 via the communication interface 10 (step S2 in FIG. 4), the number of terminal IDs transmitted may be two or more. For example, the control processor 13 may transmit both an ID for advertisement tracking and a MAC address to the server 2. With this approach, even if one of the terminal IDs becomes unusable, the other terminal ID may be used as a key for the present system to operate.

Similarly, when the second application is launched, and the control processor 13 of the client terminal 1 transmits the terminal ID to the server 2 via the communication interface 10 (step S9 in FIG. 4), the number of terminal IDs transmitted may be two or more. For example, the control processor 13 may transmit both an ID for advertisement tracking and a MAC address to the server 2. With this approach, even if one of the terminal IDs becomes unusable, the other terminal ID may be used as a key for the present system to operate.

In the present system, the only condition for transmitting the converted incentive request in step S14 is whether an ad click notification has been received. Additionally, the notification time of the ad click notification may also be used as a condition. For example, the control processor 22 may transmit the converted incentive request to the first application server 3 when the time that the incentive request is received is within a predetermined time period from the notification time of the ad click notification (for example, within 24 hours). Furthermore, in the determination in step S14, the control processor 22 may transmit the converted incentive request to the first application server 3 even when no ad click notification has been received. With this configuration, an incentive is also provided to a user that has not installed the second application by clicking on the second application ad.

In the present system, the client terminal 1 transmits the terminal ID and the first application user ID to the server 2, yet the present disclosure is not limited in this way. Alternatively, the first application server 3 may transmit the terminal ID and the first application user ID to the server 2. In this case, the first application server 3 detects the launching of the first application on the client terminal 1 by communicating with the client terminal 1 and transmits the terminal ID pertaining to the client terminal 1 and the first application user ID to the server 2. Similarly, the client terminal 1 transmits the ad click notification to the server 2 in the example above, yet the present disclosure is not limited in this way. Alternatively, the first application server 3 may transmit the ad click notification to the server 2.

Similarly, in the present system, the client terminal 1 transmits the terminal ID and the second application user ID to the server 2, yet the present disclosure is not limited in this way. Alternatively, the second application server 4 may transmit the terminal ID and the second application user ID to the server 2. In this case, the second application server 4 detects the launching of the second application on the client terminal 1 by communicating with the client terminal 1 and transmits the terminal ID pertaining to the client terminal 1 and the second application user ID to the server 2. Similarly, the client terminal 1 transmits the incentive request to the server 2 in the example above, yet the present disclosure is not limited in this way. Alternatively, the second application server 4 may transmit the incentive request to the server 2.

Embodiment 2

Figure 5:
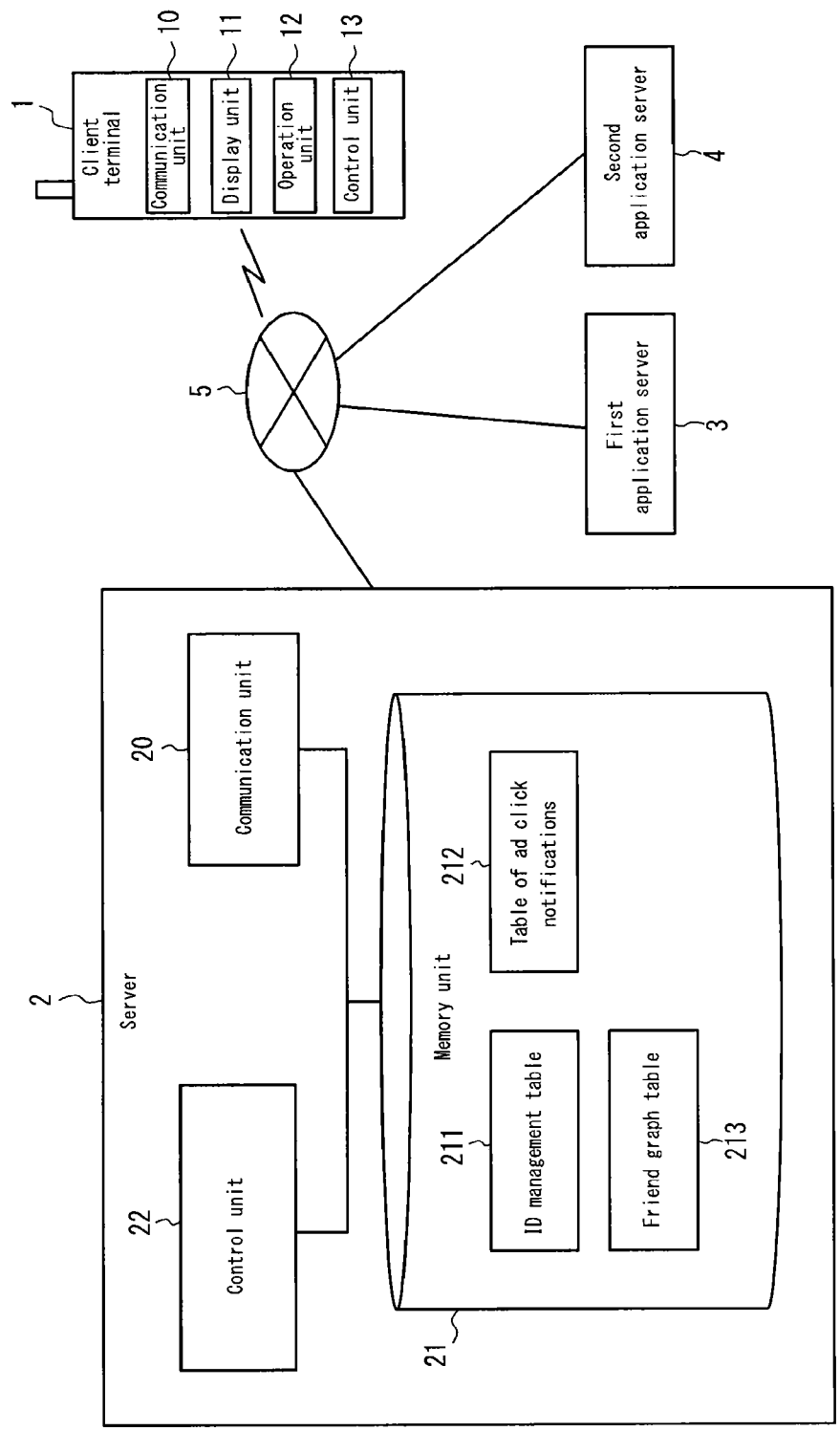
FIG. 5 is a block diagram of an incentive provision system according to Embodiment 2.

The following describes Embodiment 2 of the present disclosure. FIG. 5 is a block diagram illustrating the structure of an incentive provision system according to Embodiment 2 of the present disclosure. The same reference signs are provided for the same components as in Embodiment 1, and a description thereof is omitted. The incentive provision system according to Embodiment 2 differs from the structure of Embodiment 1 in that a friend graph pertaining to the first application is used, and in that operations pertaining to ad distribution for the second application ad differ.

In the incentive provision system according to Embodiment 2, a friend graph indicating the relationship between users is used in the first application. The first application provided by the first application server 3 is preferably an application pertaining to a social networking service (SNS). In the first application, when two users register each other as friends, they become friend users. The friend graph is information pertaining to friend users. The relationship between users indicated in the friend graph is not limited to the relationship between users that have performed friend registration and may be the relationship between users according to the group to which users belong in the game, such as a team, guild, country, or the like. In the present embodiment, in addition to the other user with whom a user has mutually performed friend registration, users belonging to the same group are also referred to as friend users.

Once the first application is launched, the control processor 13 of the client terminal 1 according to Embodiment 2 transmits the terminal ID and the first application user ID to the server 2 via the communication interface 10. Furthermore, the control processor 13 transmits information on the friend graph pertaining to the first application (friend graph information) to the server 2. Specifically, when a friend is added, changed, deleted, or the like in the first application, the control processor 13 transmits information including the first application user ID of the added, changed, or deleted friend and the user's own first application user ID to the server 2.

The control processor 13 also installs the second application on the client terminal 1. Installation of the second application may be in response to a click on the second application ad, as in Embodiment 1. Alternatively, the second application may be downloaded and installed by the user searching on a predetermined site.

After the second application is installed on the client terminal 1, based on operation of the user interface 12 by the user, the control processor 13 launches the second application. Once the second application is launched, the control processor 13 transmits the terminal ID and a second application user ID to the server 2. Furthermore, the control processor 13 transmits a notification that the second application has been installed on the client terminal 1 (installation notification) to the server 2. The second application user ID is included in the installation notification.

In addition to the ID management table 211 and the table 212 of ad click notifications, the memory 21 of the server 2 according to Embodiment 2 stores a friend graph table 213.

The friend graph table 213 is a table based on the friend graph information received from the client terminal 1. FIG. 6 illustrates an example of the friend graph table 213. The friend graph table 213 includes first application user IDs and information on the friend users for each first application user ID. For example, for the user whose first application user ID is A101, the users whose first application user IDs are A103, A121, and A157 are stored as friend users.

When receiving the friend graph information from the client terminal 1, the control processor 22 of the server 2 according to Embodiment 2 edits (adds, changes, and deletes) the friend graph table 213 in the memory 21 based on the first application user IDs included in the friend graph information.

Furthermore, when receiving an installation notification from the client terminal 1, the control processor 22 converts the second application user ID included in the installation notification to the first application user ID based on the ID management table 211. Next, the control processor 22 retrieves the first application user ID of each friend user pertaining to the first application user ID based on the friend graph table 213. Via the communication interface 20, the control processor 22 then distributes (transmits) the second application ad to the client terminal of each user corresponding to the retrieved first application user IDs of friend users. On the client terminal 1b that receives the second application ad, the second application ad is displayed when the first application is launched. The content of the second application ad is, for example, "Click here to install the second application that user X is also using! If you finish the tutorial on the second application, you'll get card X to use in the first application!".

Figure 7:
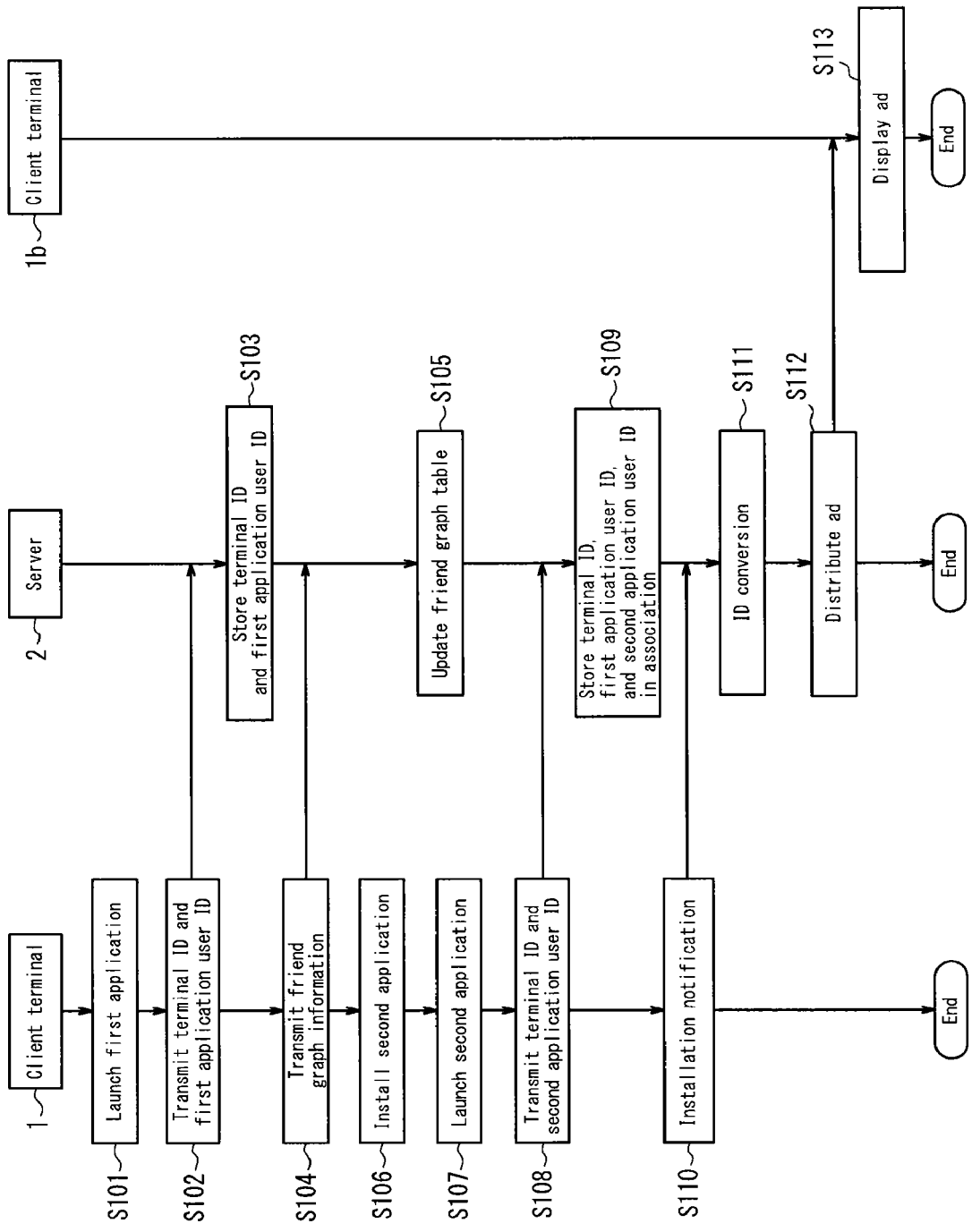
FIG. 7 is a flowchart illustrating operations of the incentive provision system according to Embodiment 2.

Next, operations for ad distribution in the incentive provision system according to the present disclosure are described with reference to the flowchart in FIG. 7. The following describes the case of the user whose terminal ID is ST001 operating the client terminal 1.

First, based on operation of the user interface 12 by the user, the control processor 13 of the client terminal 1 launches the first application installed on the terminal (step S101).

Next, the control processor 13 transmits the terminal ID (i.e. ST001) and the first application user ID (i.e. A101) to the server 2 via the communication interface 10 (step S102). The control processor 22 of the server 2 stores the terminal ID and the first application user ID in the memory 21 (step S103).

The control processor 13 transmits friend graph information pertaining to the first application to the server 2 (step S104). For example, when a user (such as first application user ID A167) is added as a friend user after the friend graph information has been transmitted to the server 2 in the past, the control processor 13 transmits friend graph information including the first application user IDs A101 and A167 to the server 2. The control processor 22 of the server 2 stores the friend graph information in the memory 21. Specifically, the control processor 22 updates the friend graph table 213 of the memory 21 (step S105). For example, based on the first application user IDs A101 and A167 included in the friend graph information, the control processor 22 adds A167 as a friend user for first application user ID A101.

Next, the client terminal 1 installs the second application on the client terminal 1 (step S106). Based on operation of the user interface 12 by the user, the control processor 13 then launches the second application installed on the client terminal 1 (step S107). Once the second application is launched, the control processor 13 transmits the terminal ID (i.e. ST001) and the second application user ID (i.e. B029) to the server 2 (step S108). The control processor 22 of the server 2 stores the terminal ID and the second application user ID in the memory 21 (step S109).

Furthermore, the control processor 13 transmits the installation notification to the server 2 (step S110). When receiving the installation notification from the client terminal 1, the control processor 22 of the server 2 converts the second application user ID included in the installation notification to the first application user ID based on the ID management table 211 (step S111). Next, the control processor 22 retrieves the first application user ID of each friend user pertaining to the first application user ID based on the friend graph table 213. For example, the control processor 22 retrieves the first application user IDs A103, A121, and A157 as friend users of A101. Via the communication interface 20, the control processor 22 then distributes the second application ad to the client terminal 1b of each user corresponding to the retrieved first application user IDs of friend users (step S112). On the client terminal 1b that receives the second application ad, the ad is displayed when the first application is launched (step S113). The content of the second application ad is, for example, "Click here to install the second application that user X is also using! If you finish the tutorial on the second application, you'll get card X to use in the first application!". User X corresponds to the user name or the like of the user whose first application user ID is A101. Operations pertaining to incentive provision after display of the ad are the same as the operations in FIG. 4 (steps S1 to S16).

In the incentive provision system according to Embodiment 2, the server 2 thus distributes the second application ad to friend users based on the friend graph of the first application. Via the second application ad, an incentive is provided between different applications. In the system according to Embodiment 2, a word-of-mouth effect between users can be expected since ads are distributed using the friend graph, thus increasing the advertising effect of an ad for an application displayed in another application.

The control processor 13 of the client terminal 1 may be configured to transmit in advance, to the server 2, consent information indicating whether to transmit the ad to the friend user. In this case, based on the consent information, the control processor 22 of the server 2 distributes the ad to the friend users in step S112 when consent for ad distribution is provided yet does not distribute the ad when consent is not provided. The consent information may be set for all friend users collectively or for each friend user separately. In other words, it is possible to allow one friend user to consent to ad distribution and another friend user to refuse ad distribution. With this approach, when a user does not wish to distribute ads to friend users, distribution can be suspended, thereby protecting the user's privacy.

On the client terminal 1b to which the second application ad has been distributed, when the second application ad is clicked by the user and the second application is installed, the control processor 22 of the server 2 may receive an installation notification (second installation notification) from the client terminal 1b. In this case, the second application ad is distributed to the friend users of the user of the client terminal 1b. In other words, with this structure, ads are distributed all the way to friend users of friend users. This approach allows for the second application ad to be distributed by word of mouth over a wider range based on friend lists.

Furthermore, when receiving the second installation notification, the control processor 22 of the server 2 may be configured to provide a predetermined incentive to the client terminal (client terminal 1 in FIG. 7) of the user who served as the occasion for distributing the second application ad to the client terminal 1b (notifying user). When adopting this structure, the first application user ID of the notifying user is included in the second application ad, and the first application user ID included in the second application ad is included in the second installation notification. In this way, the first application user ID of the notifying user is transmitted and received between the client terminal 1b and the server 2. Based on the first application user ID included in the second installation notification, the control processor 22 of the server 2 provides a predetermined incentive to the notifying user. With this approach, the notifying user is motivated to distribute the ad, thus encouraging broader ad distribution. When a plurality of notifying users serve as the occasion for distributing the second application ad to the client terminal 1b of a certain friend user, the control processor 22 of the server 2 may, when receiving the second installation notification, provide the predetermined incentive to all of the notifying users.

In the present system, the client terminal 1 transmits the terminal ID and the first application user ID to the server 2, yet the present disclosure is not limited in this way. Alternatively, the first application server 3 may transmit the terminal ID and the first application user ID to the server 2. In this case, the first application server 3 detects the launching of the first application on the client terminal 1 by communicating with the client terminal 1 and transmits the terminal ID pertaining to the client terminal 1 and the first application user ID to the server 2. Similarly, the client terminal 1 transmits the friend graph information to the server 2 in the example above, yet the present disclosure is not limited in this way. Alternatively, the first application server 3 may transmit the friend graph information to the server 2.

Similarly, in the present system, the client terminal 1 transmits the terminal ID and the second application user ID to the server 2, yet the present disclosure is not limited in this way. Alternatively, the second application server 4 may transmit the terminal ID and the second application user ID to the server 2. In this case, the second application server 4 detects the launching of the second application on the client terminal 1 by communicating with the client terminal 1 and transmits the terminal ID pertaining to the client terminal 1 and the second application user ID to the server 2. Similarly, the client terminal 1 transmits the installation notification to the server 2 in the example above, yet the present disclosure is not limited in this way. Alternatively, the second application server 4 may transmit the installation notification to the server 2. Similarly, the client terminal 1b transmits the second installation notification to the server 2 in the example above, yet the present disclosure is not limited in this way. Alternatively, the second application server 4 may transmit the second installation notification to the server 2.

A computer is preferably used to function as the client terminal 1 or the server 2. A program containing the processing for achieving the functions of the client terminal 1 or the server 2 is stored in the memory of the computer, and the functions are achieved by the central processing unit (CPU) of the computer reading and executing the program.

Although the present disclosure has been described based on drawings and examples, it is to be noted that various changes and modifications will be apparent to those skilled in the art based on the present disclosure. Therefore, such changes and modifications are to be understood as included within the scope of the present disclosure. For example, the functions and the like included in the various means and steps may be reordered in any logically consistent way. Furthermore, means or steps may be combined into one or divided.

The invention claimed is:

1. A method comprising:
    receiving notification of a click of a link for installation of a second application while a first application is launched, the notification including a first app user identifier that identifies a first user in the first application;
    storing, in a memory, an indication of receiving the notification of the click in association with the first app user identifier;
    receiving a first digital benefit request including a second app user identifier of the first user, that identifies the first user in the second application, when a predetermined operation pertaining to the second application is performed, the first digital benefit request being information requesting provision of a digital benefit in the first application, and the predetermined operation being an operation by the first user on a user terminal to launch the second application or to perform an action within the second application after launching the second application;
    upon receiving the first digital benefit request, determining whether the indication of receiving the notification of the click that is in association with the first app user identifier corresponding to the second app user identifier included in the first digital benefit request exists in the memory; and
    based on the first digital benefit request, causing provision of the digital benefit in the first application to the first user in response to determining that the indication of receiving the notification of the click that is in association with the first app user identifier corresponding to the second app user identifier included in the first digital benefit request exists in the memory, wherein
    the first app user identifier is stored in association with an indication of the predetermined operation pertaining to the second application having been performed.

2. The method of claim 1, further comprising
    causing the second application to be installed in response to receiving the notification.

3. The method of claim 2, wherein
    the digital benefit is caused to be provided in response to receiving the first digital benefit request within a predetermined time period from receipt of the notification.

4. The method of claim 1, wherein
    the digital benefit is for use in only the first application.

5. The method of claim 1, further comprising
    receiving a second digital benefit request including the second app user identifier of a second user, that identifies the second user in the second application, when the predetermined operation pertaining to the second application is performed, the second user having a predetermined relationship with the first user; and
    based on the second digital benefit request, causing provision of the digital benefit in the first application to the second user by determining the second user based on the first app user identifier of the second user, that identifies the second user in the first application, corresponding to the second app user identifier of the second user.

6. The method of claim 1, further comprising
    transmitting second application information to a second user having a predetermined relationship with the first user, based on the predetermined operation.

7. A system comprising:
    circuitry configured to
        receive notification of a click of a link for installation of a second application while a first application is launched, the notification including a first app user identifier that identifies a first user in the first application;
        store, in a memory, an indication of receiving the notification of the click in association with the first app user identifier;
        receive a first digital benefit request including a second app user identifier of the first user, that identifies the first user in the second application, when a predetermined operation pertaining to the second application is performed, the first digital benefit request being information requesting provision of a digital benefit in the first application, and the predetermined operation being an operation by the first user on a user terminal to launch the second application or to perform an action within the second application after launching the second application;
        upon receiving the first digital benefit request, determine whether the indication of receiving the notification of the click that is in association with the first app user identifier corresponding to the second app user identifier included in the first digital benefit request exists in the memory; and
        based on the first digital benefit request, cause provision of the digital benefit in the first application to the first user in response to determining that the indication of receiving the notification of the click that is in association with the first app user identifier corresponding to the second app user identifier included in the first digital benefit request exists in the memory, wherein
    the first app user identifier is stored in association with an indication of the predetermined operation pertaining to the second application having been performed.

8. The system of claim 7, wherein
    the circuitry is further configured to
        cause the second application to be installed in response to receiving the notification.

9. The system of claim 8, wherein
    the digital benefit is caused to be provided in response to receiving the first digital benefit request within a predetermined time period from receipt of the notification.

10. The system of claim 7, wherein
    the digital benefit is for use in only the first application.

11. The system of claim 7, wherein
    the circuitry is further configured to
        receive a second digital benefit request including the second app user identifier of a second user, that identifies the second user in the second application, when the predetermined operation pertaining to the second application is performed, the second user having a predetermined relationship with the first user; and
        based on the second digital benefit request, cause provision of the digital benefit in the first application to the second user by determining the second user based on the first app user identifier of the second user, that identifies the second user in the first application, corresponding to the second app user identifier of the second user.

12. The system of claim 7, wherein
the circuitry is further configured to transmit second application information to a second user having a predetermined relationship with the first user, based on the predetermined operation.

13. A non-transitory computer-readable medium storing thereon computer program instructions causing a system to execute:
receiving notification of a click of a link for installation of a second application while a first application is launched, the notification including a first app user identifier that identifies a first user in the first application;
storing, in a memory, an indication of receiving the notification of the click in association with the first app user identifier;
receiving a first digital benefit request including a second app user identifier of the first user, that identifies the first user in the second application, when a predetermined operation pertaining to the second application is performed, the first digital benefit request being information requesting provision of a digital benefit in the first application, and the predetermined operation being an operation by the first user on a user terminal to launch the second application or to perform an action within the second application after launching the second application;
upon receiving the first digital benefit request, determining whether the indication of receiving the notification of the click that is in association with the first app user identifier corresponding to the second app user identifier included in the first digital benefit request exists in the memory; and
based on the first digital benefit request, causing provision of the digital benefit in the first application to the first user in response to determining that the indication of receiving the notification of the click that is in association with the first app user identifier corresponding to the second app user identifier included in the first digital benefit request exists in the memory, wherein
the first app user identifier is stored in association with an indication of the predetermined operation pertaining to the second application having been performed.

14. The non-transitory computer-readable medium of claim 13, wherein the computer program instructions further cause the system to execute
causing the second application to be installed in response to receiving the notification.

15. The non-transitory computer-readable medium of claim 14, wherein
the digital benefit is caused to be provided in response to receiving the first digital benefit request within a predetermined time period from receipt of the notification.

16. The non-transitory computer-readable medium of claim 13, wherein
the digital benefit is for use in only the first application.

17. The non-transitory computer-readable medium of claim 13, wherein the computer program instructions further cause the system to execute
receiving a second digital benefit request including the second app user identifier of a second user, that identifies the second user in the second application, when the predetermined operation pertaining to the second application is performed, the second user having a predetermined relationship with the first user; and
based on the second digital benefit request, causing provision of the digital benefit in the first application to the second user by determining the second user based on the first app user identifier of the second user, that identifies the second user in the first application, corresponding to the second app user identifier of the second user.

* * * * *